(12) United States Patent
Park et al.

(10) Patent No.: US 12,341,350 B2
(45) Date of Patent: Jun. 24, 2025

(54) DEVICE AND METHOD FOR CONTROLLING TRANSMISSION OF POWER IN WIRELESS POWER TRANSMITTING SYSTEM

(71) Applicant: LG Electronics Inc., Seoul (KR)

(72) Inventors: Joonho Park, Seoul (KR); Bongsik Kwak, Seoul (KR); Sungkyu Kim, Seoul (KR); Jihyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 17/044,600

(22) PCT Filed: Apr. 2, 2019

(86) PCT No.: PCT/KR2019/003849
§ 371 (c)(1),
(2) Date: Oct. 1, 2020

(87) PCT Pub. No.: WO2019/194524
PCT Pub. Date: Oct. 10, 2019

(65) Prior Publication Data
US 2021/0028653 A1    Jan. 28, 2021

(30) Foreign Application Priority Data
Apr. 5, 2018 (KR) .......... 10-2018-0039995

(51) Int. Cl.
*H02J 50/12* (2016.01)
*H02J 50/00* (2016.01)
(Continued)

(52) U.S. Cl.
CPC ............ *H02J 50/12* (2016.02); *H02J 50/005* (2020.01); *H02J 50/402* (2020.01); *H02J 50/60* (2016.02); *H02J 50/80* (2016.02)

(58) Field of Classification Search
None
See application file for complete search history.

(56) References Cited

U.S. PATENT DOCUMENTS

2016/0134334 A1* 5/2016 Park .................. H04B 5/266
                                                              307/104
2016/0285317 A1    9/2016 Maniktala
(Continued)

FOREIGN PATENT DOCUMENTS

KR    20140060186    5/2014
KR    20160051502    5/2016
(Continued)

*Primary Examiner* — Daniel Kessie
(74) *Attorney, Agent, or Firm* — Fish & Richardson P.C.

(57) ABSTRACT

The present disclosure relates to a device and method for controlling transmission of power in a wireless power transmitting system. The present specification discloses a wireless power transmitting method comprising the steps of: performing a digital ping on each of a plurality of coil combinations formed from a plurality of primary coils; receiving a signal intensity packet of each of the coil combinations from the wireless power receiving device; and forming the magnetic coupling by operating a coil combination selected on the basis of the signal intensity packet, and transmitting wireless power to the wireless power receiving device on the basis of the magnetic coupling. Therefore, an optimal multi-coil can be rapidly selected according to the location of the wireless power receiving device.

2 Claims, 26 Drawing Sheets

(51) Int. Cl.
*H02J 50/40* (2016.01)
*H02J 50/60* (2016.01)
*H02J 50/80* (2016.01)

(56) References Cited

U.S. PATENT DOCUMENTS

| | | | |
|---|---|---|---|
| 2016/0308397 A1* | 10/2016 | Jung | H02J 7/007182 |
| 2017/0093214 A1* | 3/2017 | Watanabe | H02J 50/60 |
| 2017/0237296 A1* | 8/2017 | Keith | H02J 7/00714 |
| | | | 307/104 |
| 2018/0131235 A1* | 5/2018 | Inoue | H02J 50/12 |
| 2018/0131242 A1* | 5/2018 | Louis | H04B 5/72 |
| 2018/0131243 A1* | 5/2018 | Hamaguchi | H02J 50/12 |
| 2018/0152051 A1* | 5/2018 | Kim | H02M 3/155 |
| 2020/0355751 A1* | 11/2020 | Swaans | H04B 5/79 |

FOREIGN PATENT DOCUMENTS

| | | |
|---|---|---|
| KR | 20160107776 | 9/2016 |
| KR | 20170053237 | 5/2017 |

\* cited by examiner

FIG. 3B

|  | b7 | b6 | b5 | b4 | b3 | b2 | b1 | b0 |
|---|---|---|---|---|---|---|---|---|
| Byte 0 | colspan="8" Application Profile |||||||||
| Byte 1 | Version ||||||||
| Byte 2-N-1 | Profile-specific data ||||||||

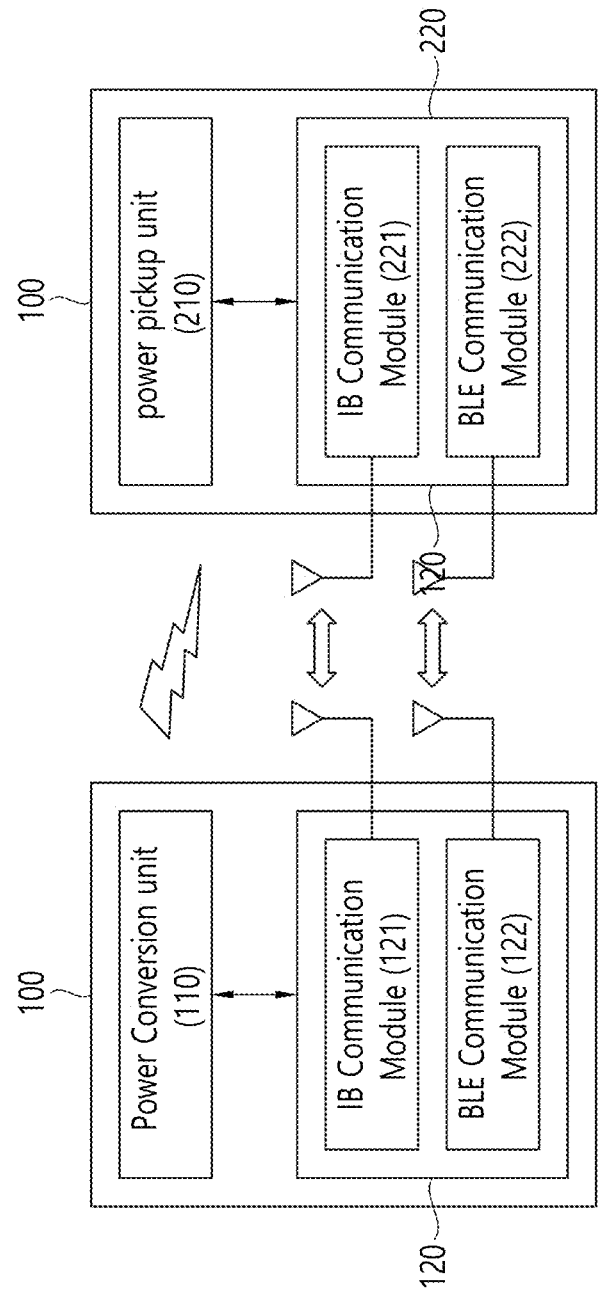

FIG. 10

| Preamble | ZERO | Response | Type | Info | Parity |

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

| Parameter | Symbol | MP new |
|---|---|---|
| Outer height | $H_o$ | 50±1 mm |
| Inner height | $H_i$ | 21±0.5 mm |
| Outer width | $W_o$ | 50±0.5 mm |
| Inner width | $W_i$ | 21±1 mm |
| Thickness | $d_c$ | 1.1±0.2 mm |
| Number of turns per layer | N | 12 |
| Number of layers | - | 1 |
| Litz wire | - | Φ0.08-105 strands wire |

(a) Single Coil Drive Method (b) Dual Coil Drive Method (c) Qual Coil Drive Method : Comm' & Power         : Power Only : Not activated         : Secondary coil : activated    : Not activated

DEVICE AND METHOD FOR CONTROLLING TRANSMISSION OF POWER IN WIRELESS POWER TRANSMITTING SYSTEM

CROSS-REFERENCE TO RELATED APPLICATIONS

This application is a National Stage application under 35 U.S.C. § 371 of International Application No. PCT/KR2019/003849, filed on Apr. 2, 2019, which claims the benefit of Korean Patent Application No. 10-2018-0039995 filed on Apr. 5, 2018. The disclosures of the prior applications are incorporated by reference in their entirety.

BACKGROUND OF THE DISCLOSURE

Field of the Disclosure

The present disclosure relates to wireless charging and, more particularly, to a device and a method for controlling transmission of power in a wireless power transmitting system.

Related Art

The wireless power transfer (or transmission) technology corresponds to a technology that can wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transmission system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Low power standards have already been established in various versions, and commercialization based on the standards is actively pursued. Meanwhile, new design wireless power transmission and reception devices are being developed to supplement existing shortcomings, such as one supporting expansion of the charging area. Together with the low power standards, standards related to medium and high power are also being discussed continually.

SUMMARY OF THE DISCLOSURE

A technical object of the present disclosure is to provide a device and a method for controlling transmission of power in a wireless power transmitting system.

Another technical object of the present disclosure is to provide a structure of a wireless power transmitter with multi-coils in a wireless power transmitting system.

Yet another technical object of the present disclosure is to provide a method for controlling operation of multi-coils by a wireless power transmitter with multi-coils.

Still another technical object of the present disclosure is to provide a device and a method for selecting appropriate multi-coils according to the position of a wireless power receiver and driving the selected multi-coils simultaneously.

According to one aspect of the present disclosure, a wireless power transmitter transmitting wireless power is provided. The device comprises a primary coil array configured to transmit wireless power to a wireless power receiver through magnetic coupling formed with a secondary coil installed in the wireless power receiver—the primary coil array comprises a plurality of primary coils; a power conversion unit configured to be connected electrically to the primary coil array and to form the magnetic coupling by applying a driving voltage to the plurality of primary coils; and a communication & control unit configured to perform a digital ping to each of a plurality of coil combinations formed from the plurality of primary coils, receive a signal strength packet for each of the coil combinations from the wireless power receiver, and control the power conversion unit so as to drive a coil combination selected based on the signal strength packet.

According to one aspect, in a pre-selection phase, the communication & control unit may be configured to set the strength of a digital ping for each primary coil.

According to another aspect, in a pre-selection phase, the communication & control unit may set the strength of a digital ping signal individually for each primary coil so that rectifier output voltage of the wireless power receiver according to the digital ping signal becomes the same for all of primary coils.

According to yet another aspect, in an analog ping phase, the communication & control unit may perform an analog ping for each of the plurality of primary coils and configure the plurality of coil combinations from at least one primary coil in which a response to the analog ping exists.

According to still another aspect, if the selected coil combination comprises dual coils, the dual coils may include at least one main coil for in-band communication and at least one adjacent coil for transmission of power.

According to another aspect of the present disclosure, provided is a method for transmitting wireless power by a wireless power transmitter including a plurality of primary coils configured to form magnetic coupling with secondary coils installed in a wireless power receiver. The method may comprise performing a digital ping for each of a plurality of coil combinations formed from the plurality of primary coils, receiving a signal strength packet for each of the coil combinations from the wireless power receiver, and forming the magnetic coupling by driving a coil combination selected based on the signal strength packet and transmitting wireless power to the wireless power receiver based on the magnetic coupling.

According to one aspect, the method may further comprise setting the strength of a digital ping for each primary coil before performing the digital ping.

According to another aspect, the method may further comprise setting the strength of a digital ping signal individually for each primary coil before performing the digital ping so that rectifier output voltage of the wireless power receiver according to the digital ping signal becomes the same for all of primary coils.

According to yet another aspect, the method may further comprise performing an analog ping for each of the plurality of primary coils before performing the digital ping, where the plurality of coil combinations may be configured from at least one primary coil in which a response to the analog ping exists.

According to still another aspect, if the selected coil combination comprises dual coils, the dual coils may include at least one main coil for in-band communication and at least one adjacent coil for transmission of power.

According to yet another aspect of the present disclosure, a wireless power receiver receiving wireless power is provided. The device comprises a secondary coil configured to receive wireless power from a wireless power transmitter through magnetic coupling formed with a primary coil array installed in the wireless power transmitter—the primary coil array comprises a plurality of primary coils; a rectifier being connected electrically to the secondary coil and obtaining a rectified voltage by rectifying a current formed in the secondary coil; and a communication & control unit configured to receive a digital ping signal from each of a plurality of coil combinations formed from the plurality of primary coils and transmit a single signal strength packet for each of the coil combinations to the wireless power transmitter.

In one aspect, in an analog ping phase, the communication & control unit may receive an analog ping from each of the plurality of primary coils, where the plurality of coil combinations may be configured from at least one primary coil in which a response to the analog ping exists.

In another aspect, if the selected coil combination comprises dual coils, the dual coils may include at least one main coil for in-band communication and at least one adjacent coil for transmission of power.

According to still another aspect of the present disclosure, provided is a method for receiving wireless power by a wireless power receiver including a secondary coil configured to form magnetic coupling with a primary coil array installed in a wireless power transmitter. The method may comprise receiving a digital ping signal from each of a plurality of coil combinations formed from the plurality of primary coils, transmitting a single signal strength packet for each of the coil combinations to the wireless power transmitter, and receiving wireless power through the magnetic coupling formed by a coil combination selected based on the signal strength packet.

In one aspect, the method may receive an analog ping from each of the plurality of primary coils before receiving the digital ping signal, where the plurality of coil combinations may be configured from at least one primary coil in which a response to the analog ping exists.

In another aspect, if the selected coil combination comprises dual coils, the dual coils may include at least one main coil for in-band communication and at least one adjacent coil for transmission of power.

The present disclosure provides an effect that the optimal multi-coils may be selected promptly according to the position of a wireless power receiver.

BRIEF DESCRIPTION OF THE DRAWINGS

FIG. 3B shows an example of a WPC NDEF in a wireless power transfer system.

FIG. 4C is a block diagram illustrating a wireless power transfer system using BLE communication according to an example.

FIG. 10 is a structure of a sync pattern according to an exemplary embodiment of the present disclosure.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
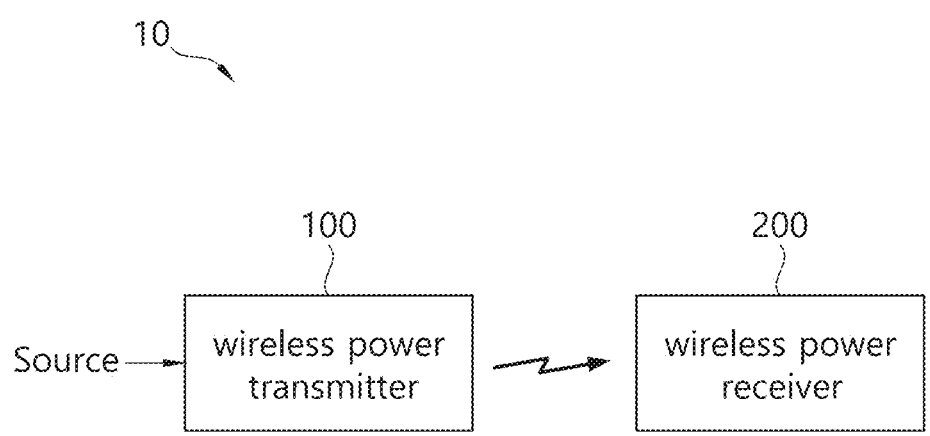
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
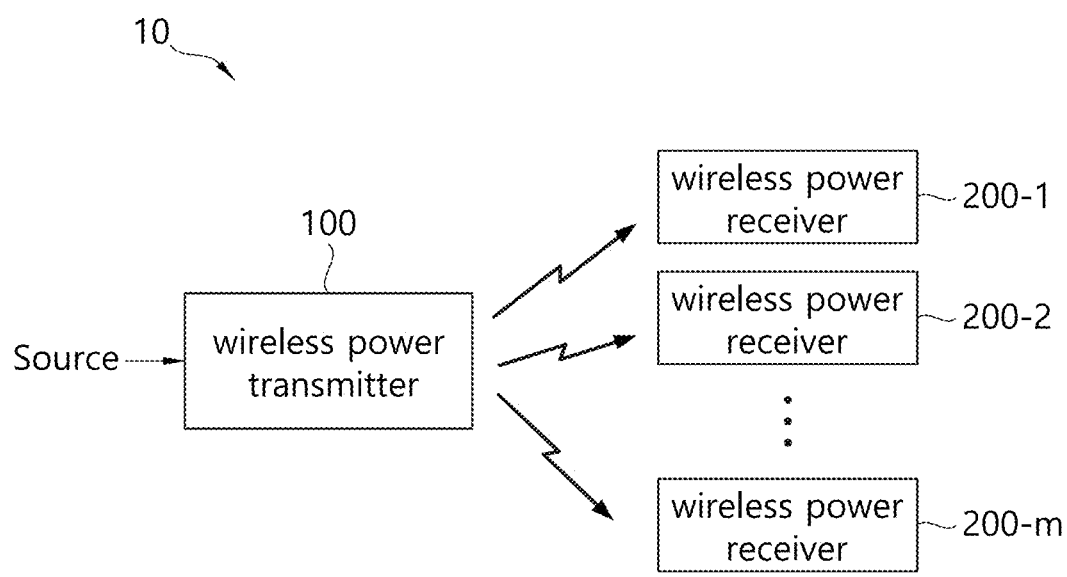
FIG. 2 is a block diagram of a wireless power system (10) according to another exemplary embodiment of the present disclosure.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, ..., 200-M). Most particularly, in case the wireless power transfer (or transmission) is performed by using a magnetic resonance method, one wireless power transmitter (100) may transfer power to multiple wireless power receivers (200-1, 200-2, ..., 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
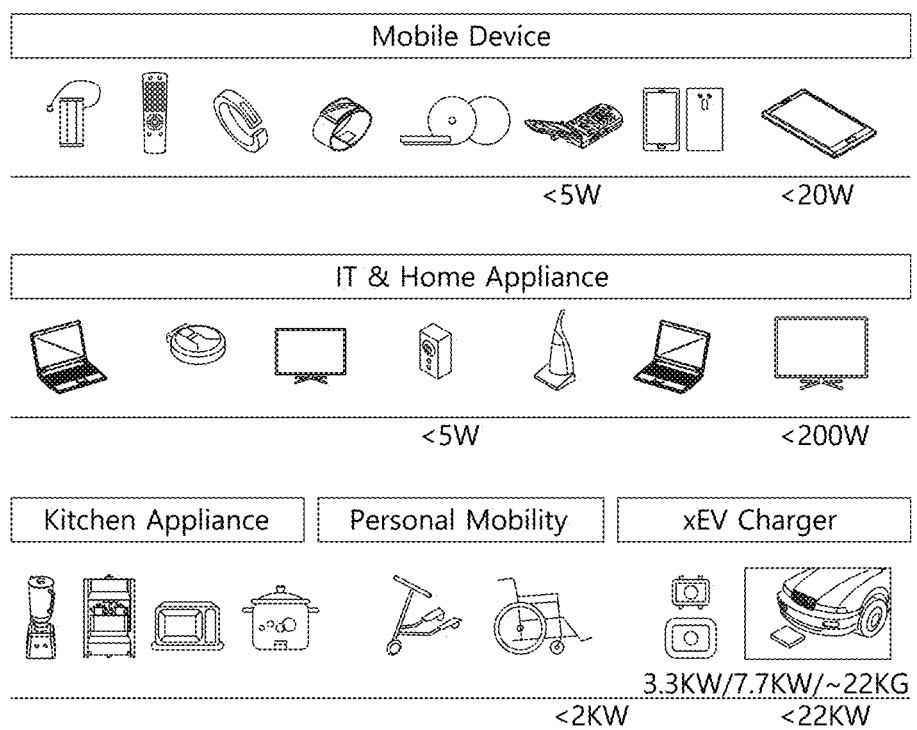
FIG. 3A shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3a, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and D3 is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ###hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF). The WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | PTX_IN_MAX | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | PRX_OUT_MAX' | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the PTX_IN_MAX of the corresponding class. The PRU cannot draw a power that is higher than the power level specified in the corresponding category.

Figure 4A:
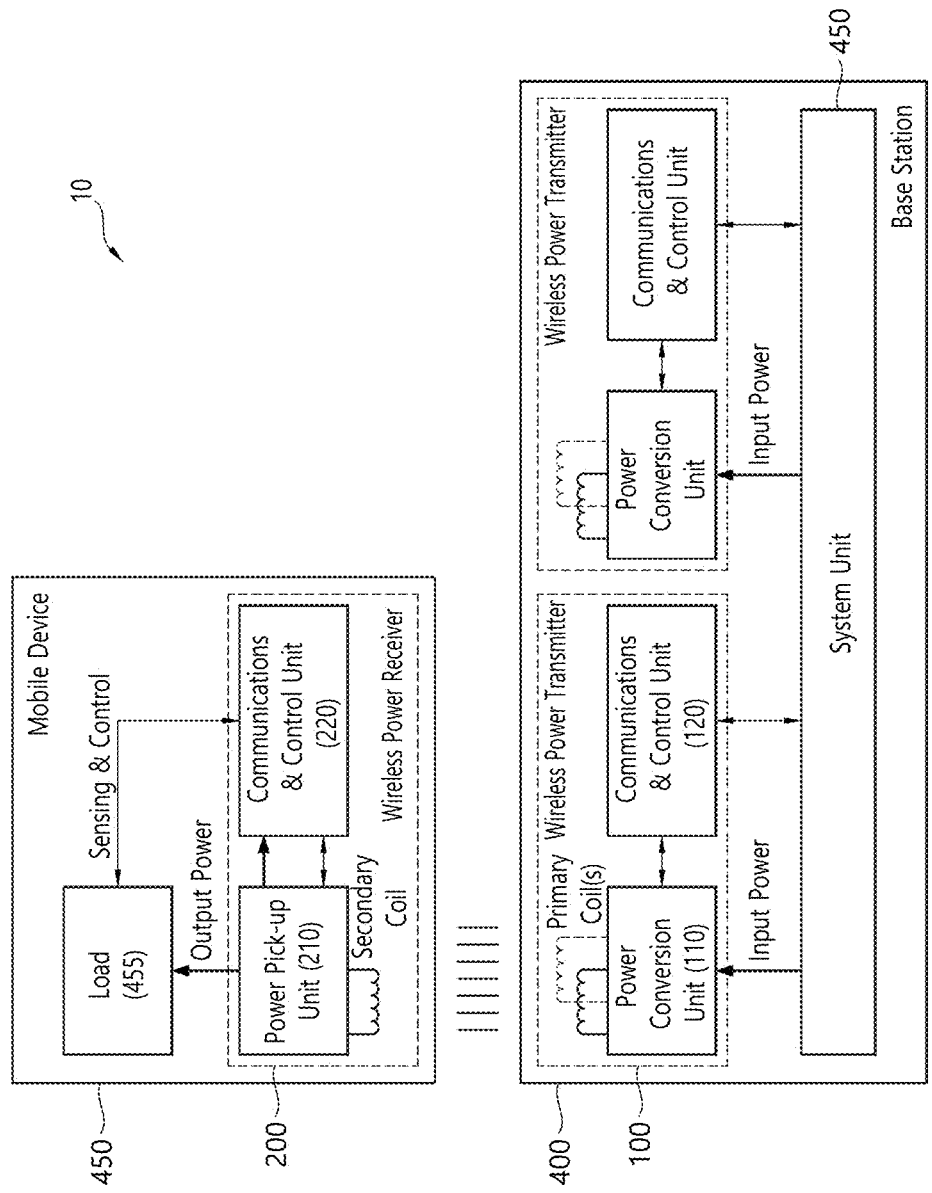
FIG. 4A is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The D3 communication module may transmit and/or receive information by using a magnetic wave, which uses a specific frequency as its center frequency. For example, the communications & control unit (120) may perform in-band (IB) communication by transmitting information on the magnetic wave through the primary coil or by receiving information on the magnetic wave through the primary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The D3 communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
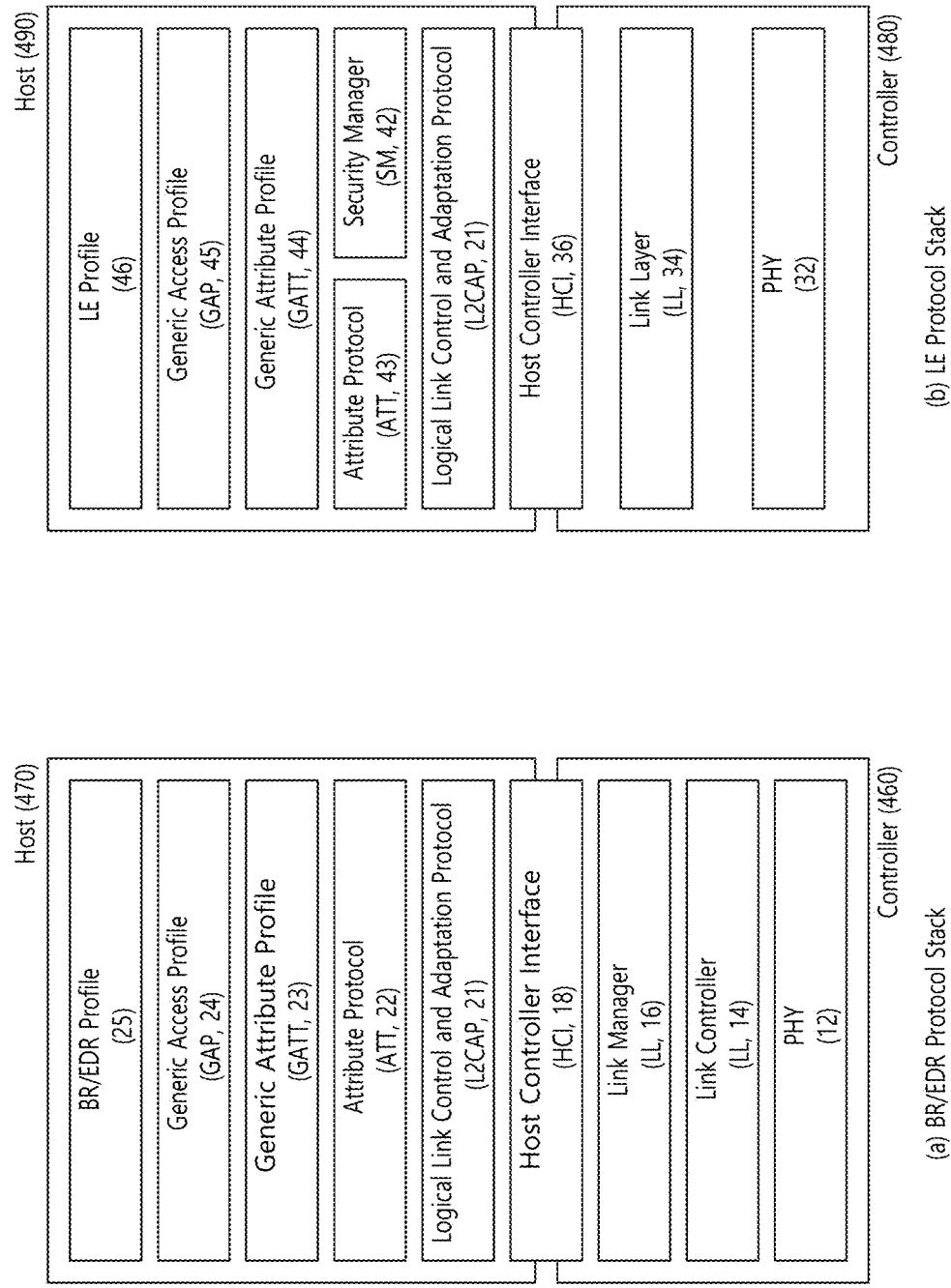
FIG. 4B is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4B.

FIG. 4B is a diagram illustrating an example of a Bluetooth communication architecture to which an embodiment according to the present disclosure may be applied.

Referring to FIG. 4B, (a) of FIG. 4B shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4B, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4B, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make a supplemental information request or a connection request.

In contrast, directed advertising may make a supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| Modulation level | Number of cycles per bit |
| --- | --- |
| 0 (default) | 256 |
| 1 | 128 |
| 2 | 64 |
| 3 | 32 |
| 4 | 16 |
| 5 | 8 |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

When the communication/control circuit 120 and the communication/control circuit 220 include Bluetooth or Bluetooth LE as an OB communication module or a short-range communication module in addition to the D3 communication module, the wireless power transmitter 100 including the communication/control circuit 120 and the wireless power receiver 200 including the communication/control circuit 220 may be represented by a simplified block diagram as shown in FIG. 4C.

FIG. 4C is a block diagram illustrating a wireless power transfer system using BLE communication according to an example.

Referring to FIG. 4C, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4B. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
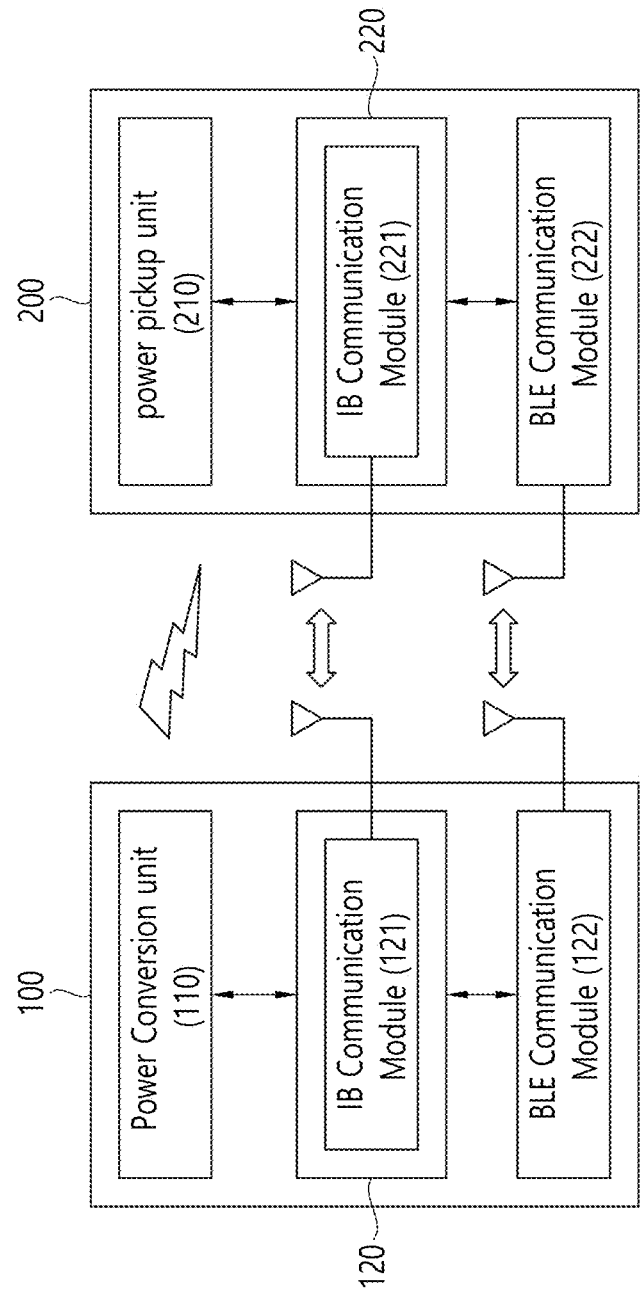
FIG. 4D is a block diagram illustrating a wireless power transfer system using BLE communication according to another example.

Referring to FIG. 4D, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
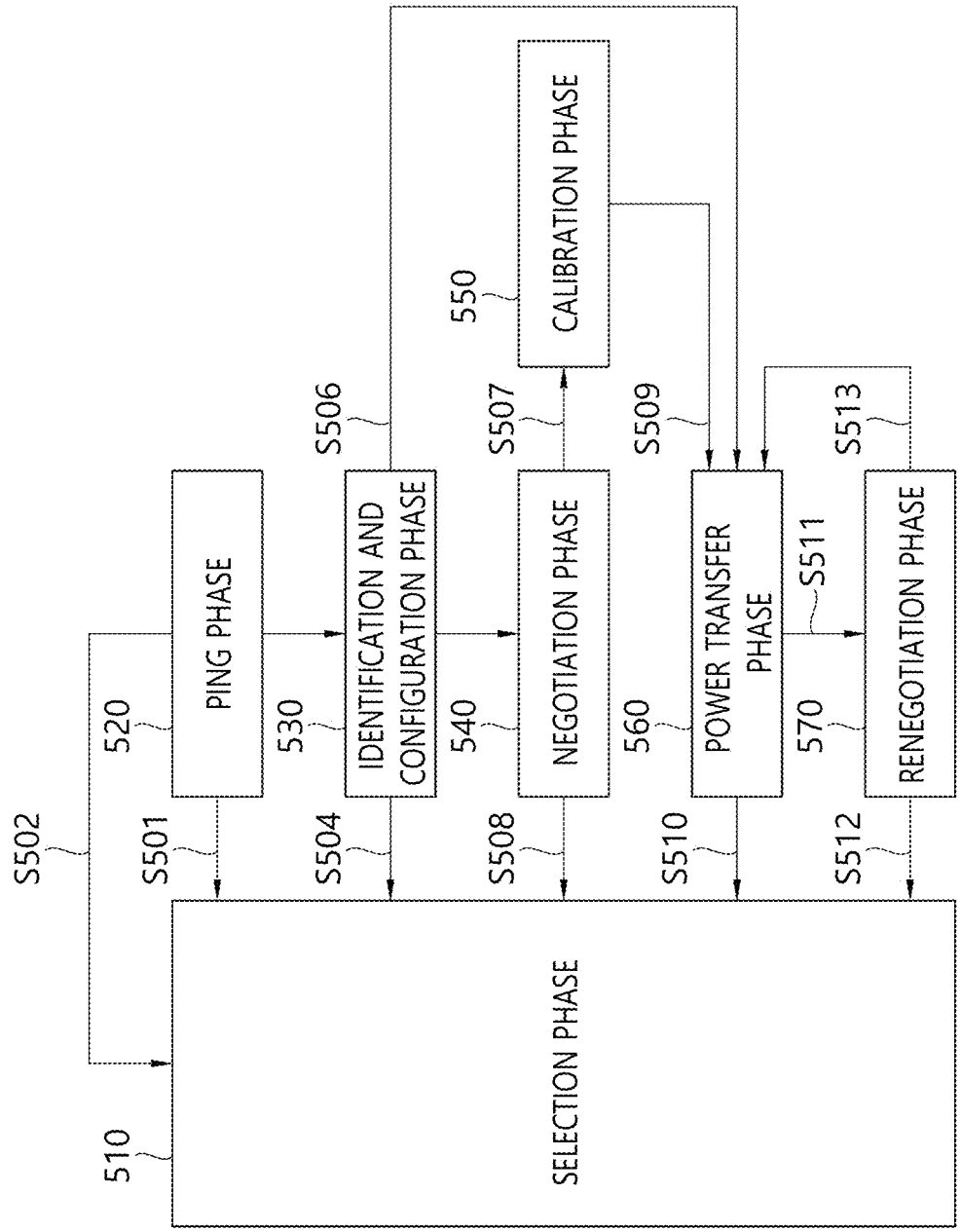
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
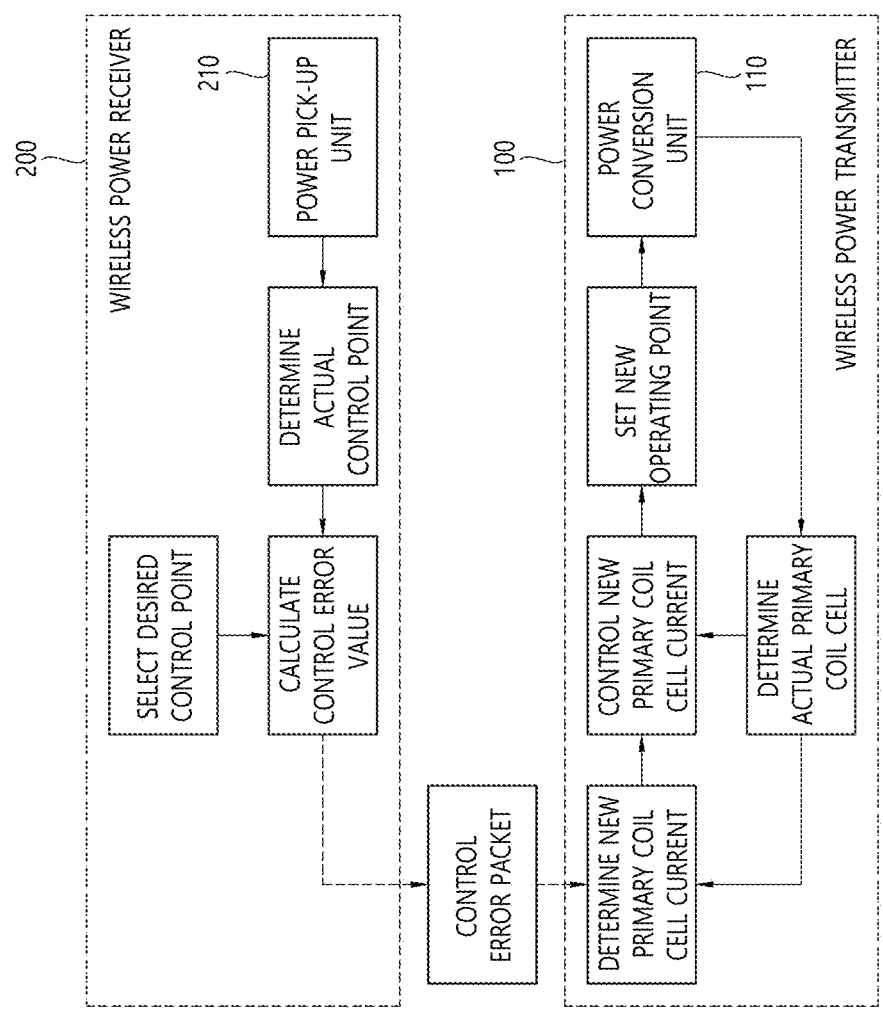
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
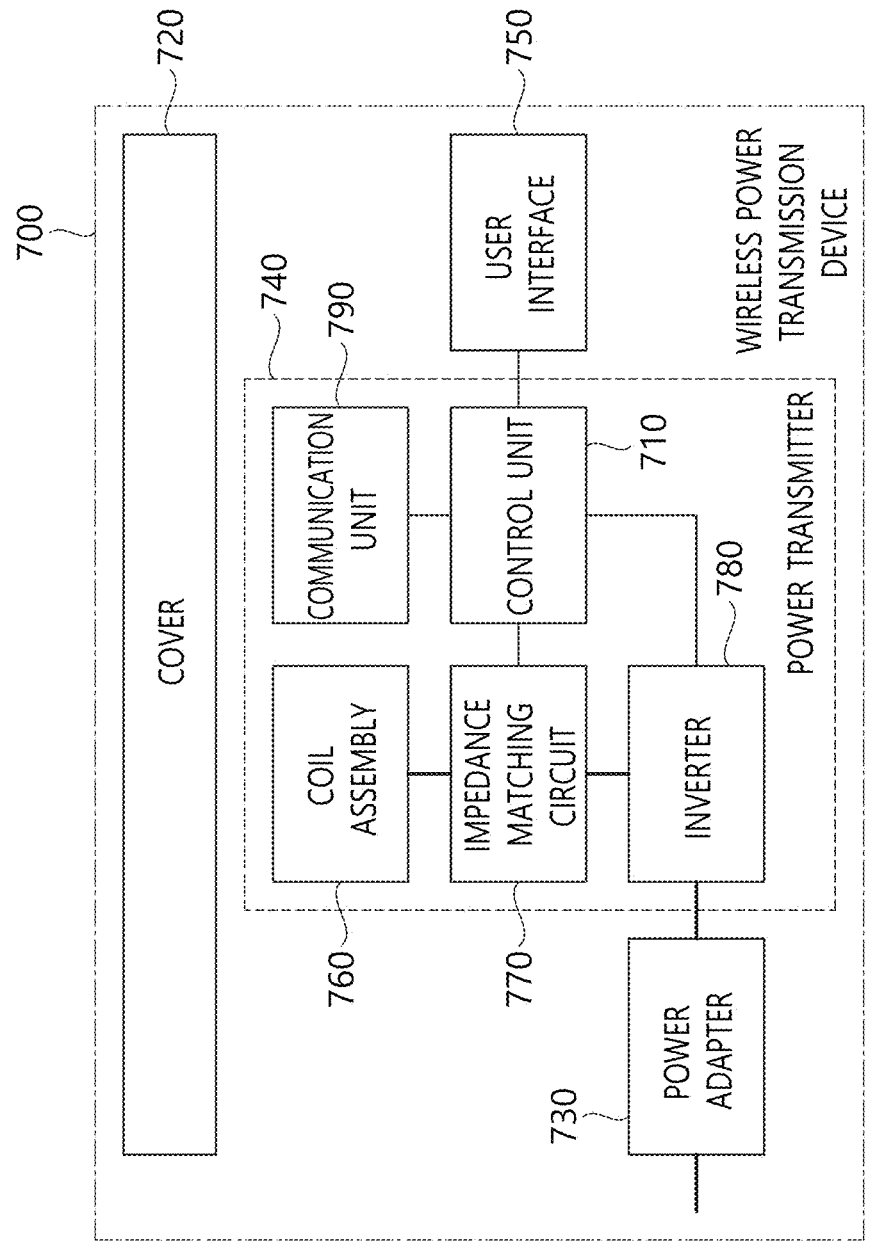
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
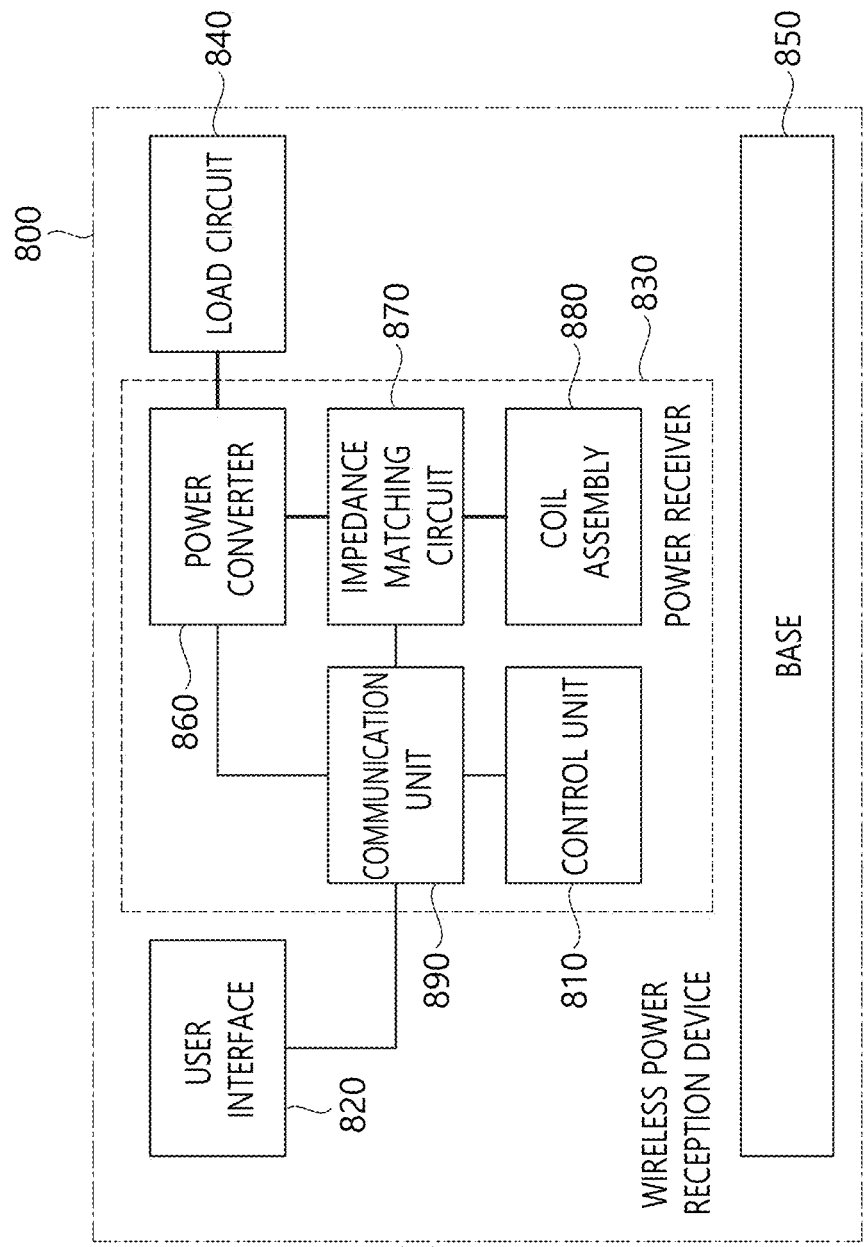
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
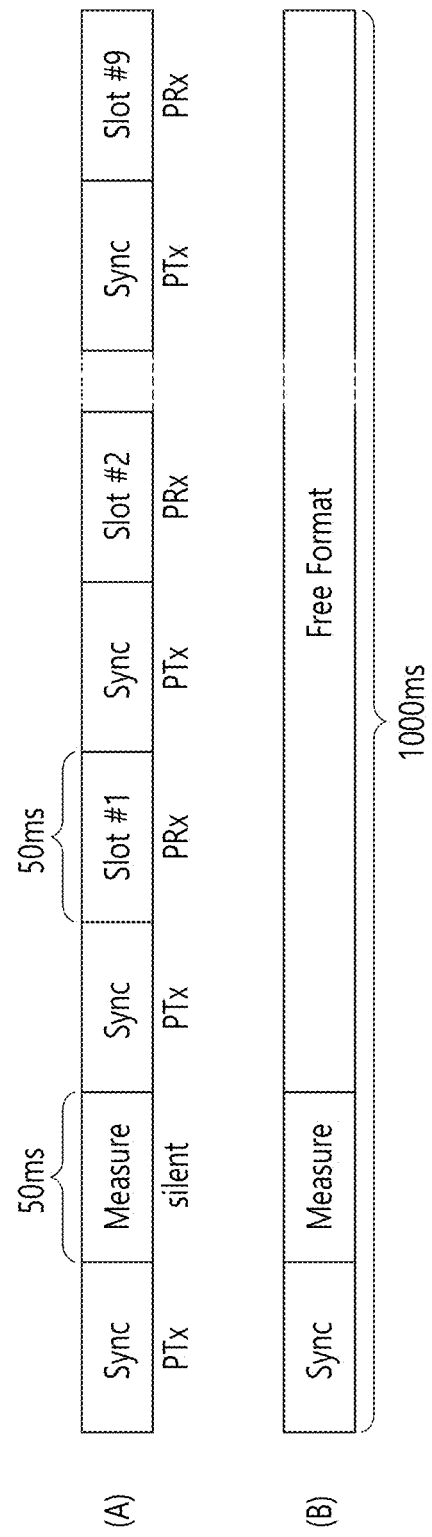
FIG. 9 shows a communication frame structure according to an exemplary embodiment of the present disclosure.

FIG. 9 shows a communication frame structure according to an exemplary embodiment of the present disclosure. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 11:
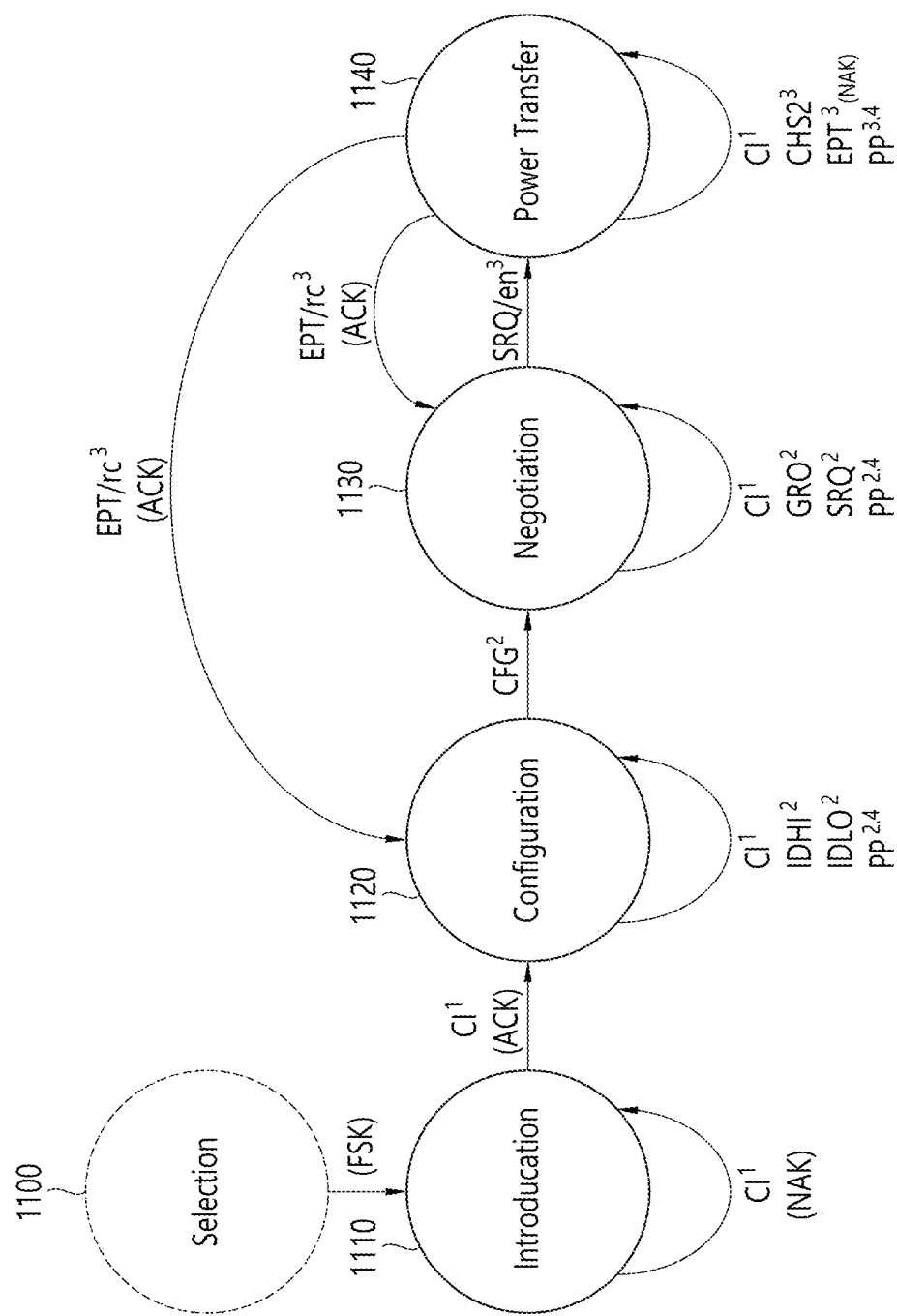
FIG. 11 shows operation statuses of a wireless power transmitter and a wireless power receiver in a shared mode according to an exemplary embodiment of the present disclosure.

FIG. 11 shows operation statuses of a wireless power transmitter and a wireless power receiver in a shared mode according to an exemplary embodiment of the present disclosure.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

In what follows, a method for controlling multi-coil driving by a wireless power transmitter with multi-coils will be disclosed in detail.

Figure 12A:
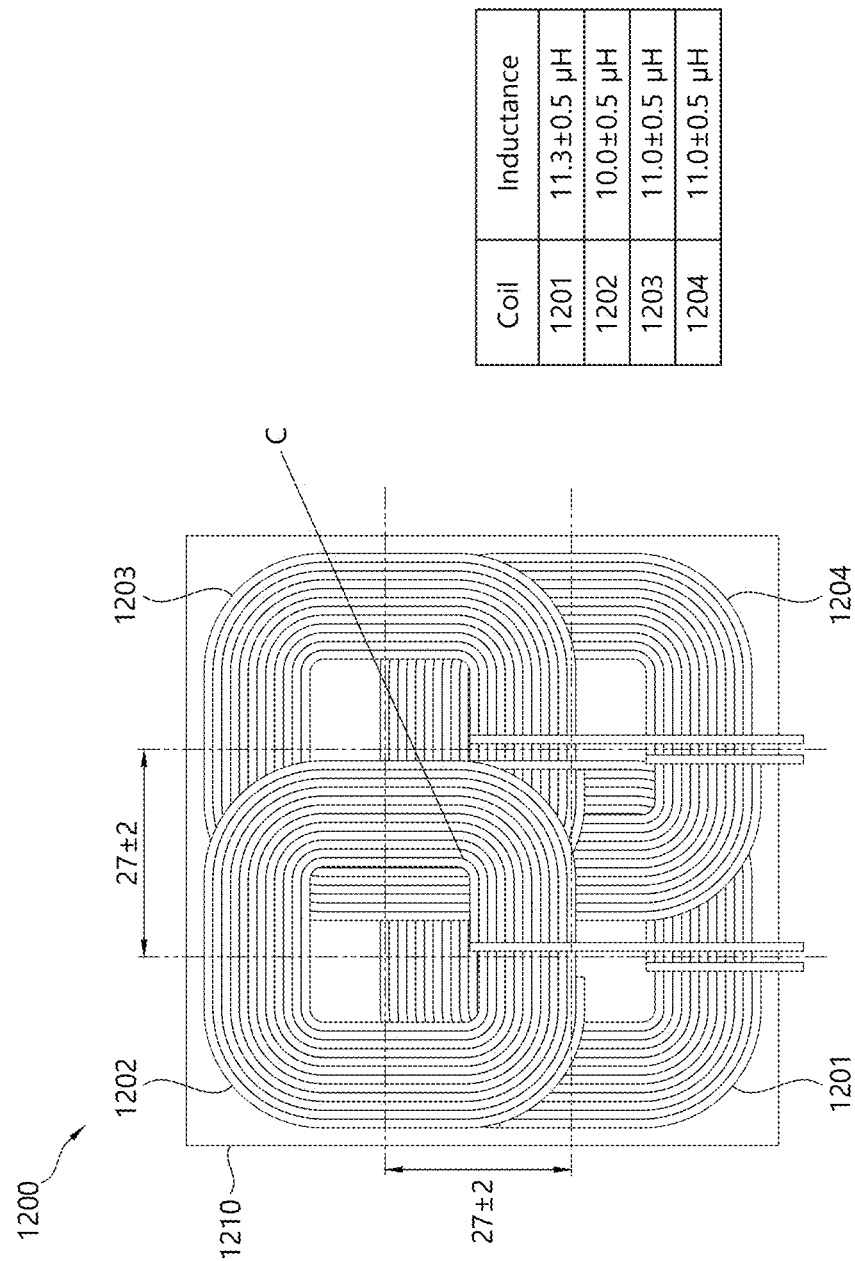
FIGS. 12a and 12b are plan and side views illustrating a primary coil array and a shielding member included in a wireless power transmitter according to one embodiment.
Figure 12B:
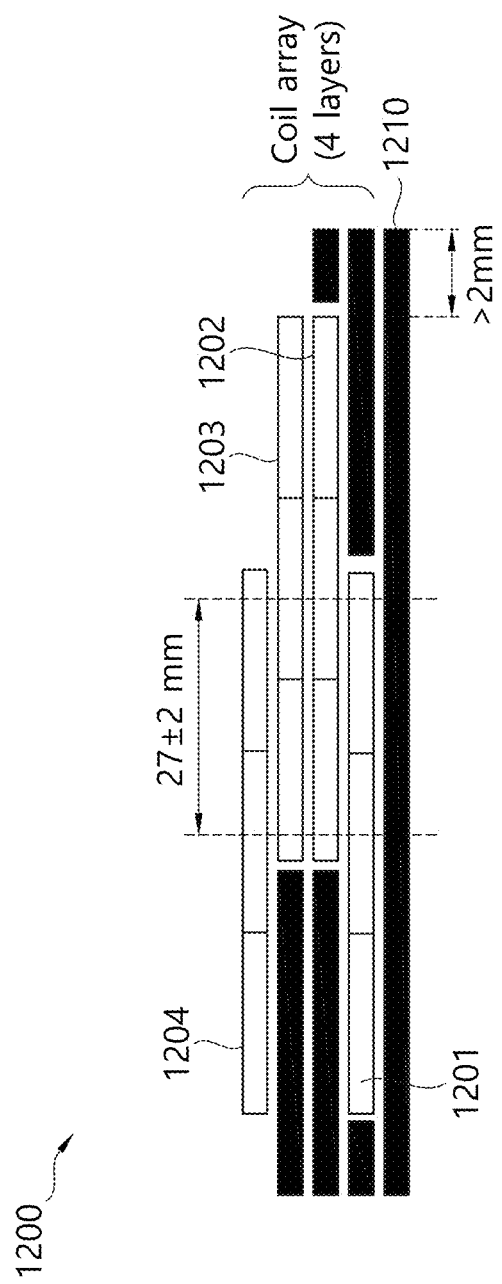
Figure 12C:
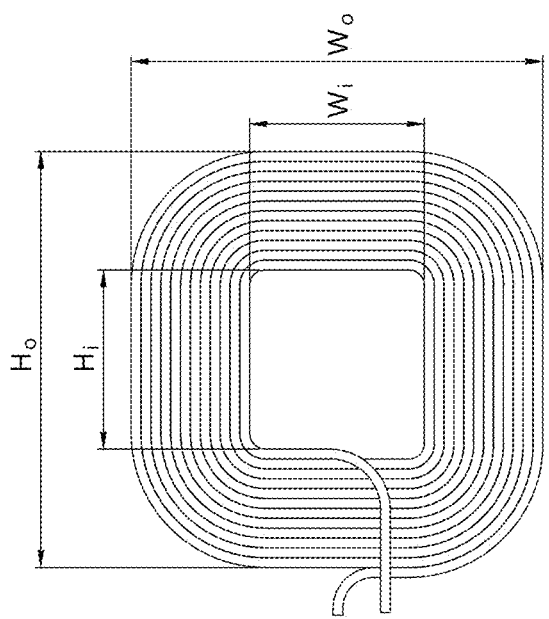
FIG. 12c shows physical parameters of the respective primary coils.

FIGS. 12a and 12b are plan and side views illustrating a primary coil array and a shielding member included in a wireless power transmitter according to one embodiment, and FIG. 12c shows physical parameters of the respective primary coils.

Referring to FIGS. 12a to 12c, a wireless power transmitter includes a shielding member 1210 and a module 1200 being disposed on the shielding member 1210 and comprising a primary coil array 1201, 1202, 1203, 1204 in which a plurality of primary coils are arranged to overlap with each other. Here, the wireless power transmitter may be the wireless power transmitter 100 of FIG. 4, and the module 1200 may be the power conversion unit 110.

The primary coil array 1201, 1202, 1203, 1204 is constructed to have a stacking structure in the vertical direction (along the z-axis) such that each primary coil forms a single layer and an overlapping structure in the horizontal plan (x-y plane) such that primary coils of the respective layers overlap with each other in a counter-clockwise direction (or clockwise direction) from the primary coil 1201 of the first layer to the primary coil of the fourth layer 1204. Therefore, if the primary coil array 1201, 1202, 1203, 1204 is divided into four quadrants on the plane with respect to the center C, the primary coils of the respective layers are disposed evenly over each quadrant. For example, the primary coil 1201 of the first layer is disposed on the third quadrant, the primary coil 1204 of the second layer is disposed on the fourth quadrant, the primary coil 1203 of the third layer is disposed on the first quadrant, and the primary coil 1202 of the fourth layer is disposed on the second quadrant. In other words, the primary coil array 1201, 1202, 1203, 1204 has a 2×2 square shape in the horizontal plane.

Figure 13A:
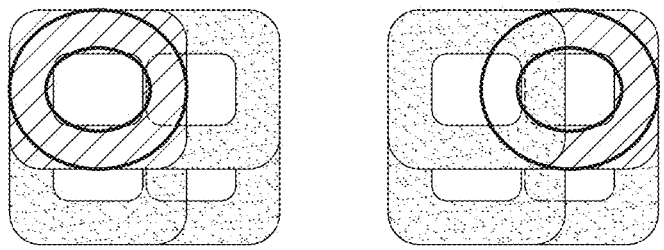
FIG. 13a illustrates various coil driving methods according to one example.
Figure 13A:
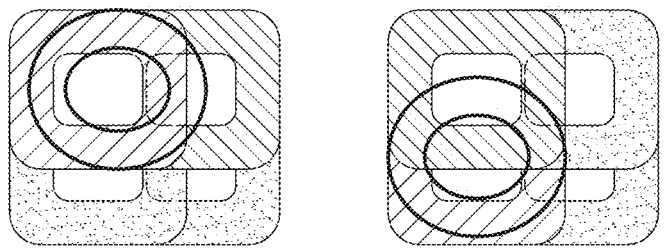
Figure 13A:
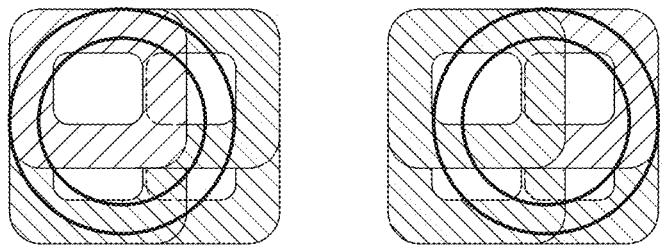
Figure 13A:
Figure 13A:
Figure 13A:
Figure 13A:

The primary coil according to the present embodiment may be driven (or activated) individually. To drive (or activate) the primary coil separately, a dedicated driving circuit (namely, an inverter) may be connected to each primary coil. In other words, each primary coil may be arranged so as to receive separate power. In this way, as shown in FIG. 13a, depending on the position of the secondary coil 1205 placed on the primary coil array, only one primary coil may be driven (or activated) selectively (a) or a plurality of primary coils may be driven (or activated) simultaneously (b, c). Here, activation may refer to the operation for transmitting power through the primary coil by applying a current or a voltage to the primary coil or switching to a mode in which communication is performed.

(b) shows a case in which the secondary coil of a wireless power receiver is placed between two primary coils to activate the two primary coils simultaneously (so-called dual coil driving).

According to one embodiment, when a plurality of primary coils are activated simultaneously, at least one primary coil may be configured to perform both communication and power transmission, and the other primary coils may be configured only to transmit power without performing communication. Here, the primary coil configured to perform both communication and power transfer may be referred to as a main coil while the primary coil configured to perform only power transfer may be referred to as an adjacent coil. The main coil and adjacent coil are not necessarily limited to the primary coil at a particular position but may be selected variably depending on the position of a secondary coil. Communication performed by the main coil includes in-band communication.

According to another embodiment, when a plurality of primary coils is activated simultaneously, primary coils performing communication may be separated from the primary coils for transmitting power. In other words, at least one primary coil may be configured to perform communication with a wireless power receiver, and the other primary coils may be configured to transmit power to the wireless power receiver.

(c) shows a case in which a secondary coil with a relatively large size is placed on the primary coil array to activate all of the primary coils simultaneously (so-called quad coil driving).

According to one embodiment, when all of the primary coils are activated simultaneously, at least one primary coil(s) is configured to perform both communication and power transmission, and the other primary coil(s) may be configured only to transmit power without performing communication. Here, the primary coil configured to perform both communication and power transfer may be referred to as a main coil while the primary coil configured to perform only power transfer may be referred to as an adjacent coil. The main coil and adjacent coil are not necessarily limited to the primary coil at a particular position but may be selected variably depending on the position of a secondary coil.

According to another embodiment, when a plurality of primary coils is activated simultaneously, primary coils performing communication may be separated from the primary coils for transmitting power. In other words, at least one primary coil(s) may be configured to perform communication with a wireless power receiver, and the other primary coil(s) may be configured to transmit power to the wireless power receiver.

In the embodiment of (c), the communication method performed by the main coil may include in-band communication. In the case of quad-coil drive method, since all of the primary coils are involved in transmitting power, its power level is relatively high. Because of the high power level, it may be difficult to perform in-band communication using primary coils due to noise or interference. Therefore, the quad-coil drive method may use in-band communication and out-band communication in a mixed fashion. For example, during an initial driving phase, in-band communication may be used while, during a power transfer phase, out-band communication may be used. In this case, handover from in-band to out-band communication may be performed separately.

Figure 13B:
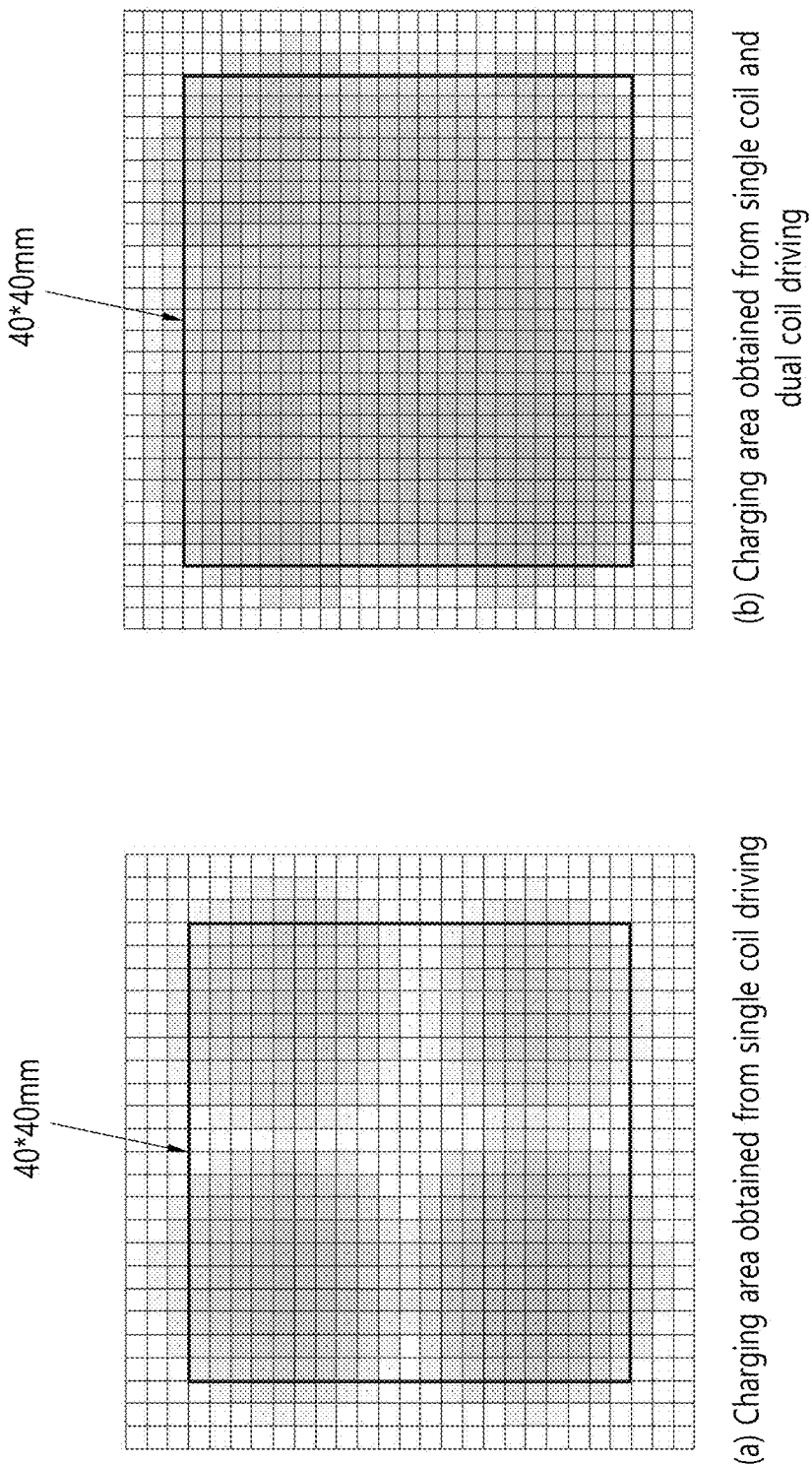
FIG. 13b is an experimental result comparing the sizes of charging areas when a single coil and dual coils are driven according to one example.

As shown in FIG. 13b, when a plurality of primary coils are driven (or activated) simultaneously, the charging area is enlarged compared with that of a single primary coil, which provides an effect of increasing positional or alignment freedom of a receiver.

FIG. 13b is an experimental result comparing the sizes of charging areas when a single coil and dual coils are driven according to one example.

Referring to FIG. 13b, (a) shows a charging area obtained from single coil driving, from which it may be known that a dead zone is formed in the center of the charging area when a single coil is driven for a BPP or EPP wireless power receiver. (b) Shows a charging area obtained from single coil and dual coil driving, from which it may be known experimentally that the dead zone in the center of the charging area is removed when the single coil is driven for the BPP or EPP wireless power receiver and an enlarged charging area is obtained compared with the case (a).

The primary coil array according to the present embodiment may provide a maximum output set individually. The set maximum output may be the same for all of the primary coils or may differ from each other. For example, a maximum output of 15 W may be set to the primary coil 1201 of the first layer, a maximum output of 15 W may be set to the first coil 1204 of the second layer, a maximum output of 15 W may be set to the first coil 1203 of the third layer, and a maximum output of 15 W may be set to the first coil 1202 of the fourth layer. In this case, the maximum output available from the whole primary coil array 1201, 1202, 1203, 1204 amounts to be 60 W (=15 W+15 W+15 W+15 W). Under this condition, if only a single primary coil is driven ((a) of FIG. 13(*a*)), wireless charging may be performed with a total output of 15 W depending on the position and/or requirement of a receiver; if two primary coils are driven ((b) of FIG. 13(*a*)) depending on the position of the receiver, wireless charging may be performed with a total output of 30 W; and if all of the four primary coils are driven ((c) of FIG. 13(*a*)) according to the position and/or requirement of the receiver, wireless charging may be performed with a total output of 60 W. Therefore, the primary coil array (1201, 1202, 1203, 1204) may provide an adaptive output according to the position (or misalignment) or power class of the receiver as well as the aforementioned alignment freedom and may be compatible with various application devices ranging from low-power receivers of several watts class to mid-power receivers of tens of watts class (or receivers of 60 watts or less), thereby increasing its scalability. In what follows, in the present disclosure, for the convenience of descriptions, it is assumed that the maximum output set to each of the primary coils belonging to the primary coil array (1201, 1202, 1203, 1204) is the same with each other; however, it should be noted that the present disclosure is not limited to the specific assumption above. Although the present disclosure discloses a primary coil array using four primary coils, the present disclosure may also include cases where the number of primary coils belonging to the primary coil array is two, three, five, and more.

As described above, as the number of primary coils, charging area, and output power are enlarged and increased, communication control between a wireless power transmitter and a wireless power receiver becomes more important. In this regard, a method for selecting a primary coil required for driving in a multi-coil wireless charging system has to be defined.

Figure 14:
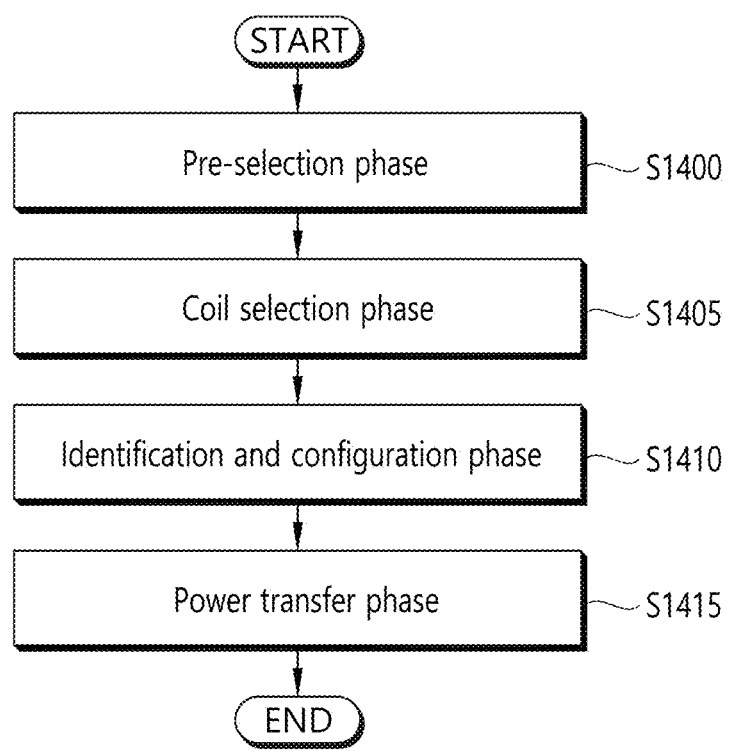
FIG. 14 is a flow diagram performing selection of a primary coil according to one embodiment.

FIG. 14 is a flow diagram performing selection of a primary coil according to one embodiment.

Referring to FIG. 14, a wireless power transmitter and a wireless power receiver enter a pre-selection phase S1400.

The operation of the wireless power transmitter in the pre-selection phase may include a phase for setting a ping level. Here, the ping level includes the levels for an analog ping and a digital ping. As an example, the phase for setting a ping level may be set individually for each of the primary coils. Also, ping levels set individually for the respective primary coils may differ from each other. This is so because the distance to the secondary coil along the z-axis varies for each primary coil, and if the variation is not compensated beforehand, the wireless power receiver may not be able to measure the signal strength of a digital ping accurately. Therefore, in the present embodiment, ping levels may be set differently from each other, but rectified voltages applied to the secondary coil may be set to be the same with each other.

If the pre-selection phase is completed, the wireless power transmitter and the wireless power receiver enter a coil selection phase S1405. The coil selection phase is intended to select a primary coil to be activated based on a signal strength (SS) packet.

The operation of a wireless power transmitter in the coil selection phase includes transmitting a digital ping signal to a wireless power receiver simultaneously through the corresponding primary coil(s) by activating a combination of primary coils, receiving a signal strength packet for the combination from the wireless power receiver, and determining an optimal combination of primary coils after performing transmission of a digital ping signal and reception of a signal strength packet performed with respect to the combination repeatedly on the other combinations.

Here, a combination of primary coils refers to a combination of one or more primary coils. For example, if the primary coils (1201, 1202, 1203, 1204) of FIG. 12*a* are denoted by 1201, 1202, 1203, and 1204 for the sake of convenience, possible combinations of primary coils may be combination #1 {1201}, combination #2 {1202}, combination #3 {1203}, combination #4 {1204}, combination #5 {1201, 1202}, combination #6 {1201, 1204}, combination #7 {1202, 1203}, combination #8 {1203, 1204}, combination #9 {1201, 1202, 1203}, combination #10 {1202, 1203, 1204}, combination #11 {1203, 1204, 1201}, and combination #12 {1201, 1202, 1203, 1204}, which amounts to a total of 12.

Figure 15:
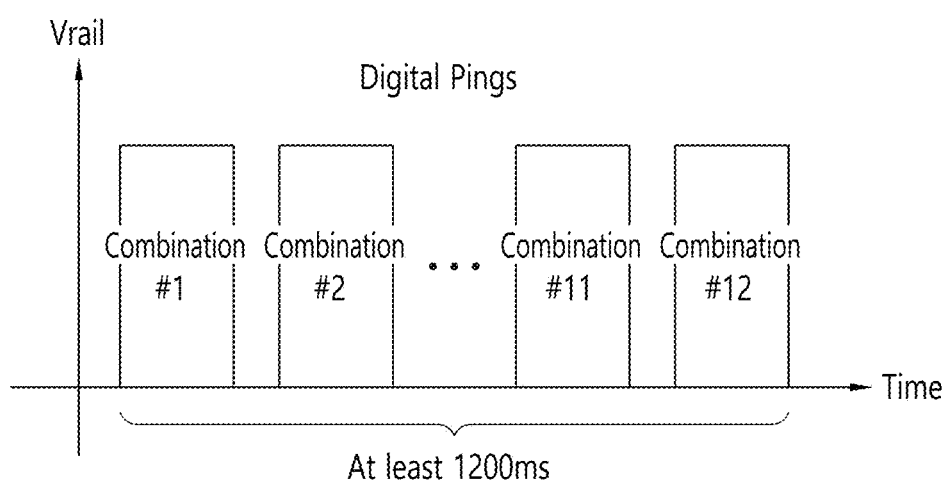
FIG. 15 illustrates a process for obtaining a signal strength packet by performing a digital ping for each combination by a wireless power transmitter according to one example.

A method for obtaining a signal strength packet by a wireless power transmitter for each combination is illustrated in FIG. 15.

FIG. 15 illustrates a process for obtaining a signal strength packet by performing a digital ping for each combination by a wireless power transmitter according to one example.

Referring to FIG. 15, a wireless power transmitter sequentially activates combinations #1 to #4 consisting of only a single primary coil, transmits a digital ping signal through each combination (the voltage applied across both ends of the coil is denoted as Vrail), and receives a signal strength packet for each individual primary coil. In this case, a signal strength packet for each signal primary coil may be obtained.

Next, the wireless power transmitter activates combinations consisting of two primary coils {1201, 1202} (namely, activates 1201 and 1202 simultaneously), transmits a digital ping signal, and receives a signal strength packet for the combinations. In this case, the wireless power transmitter transmits (or executes) a digital ping simultaneously through 1201 and 1202. In addition to the combination above, since other combinations consisting of two primary coils include {1201, 1204}, {1202, 1203}, and {1203, 1204}, the wireless power transmitter sequentially activates the remaining three combinations consisting of two primary coils, transmits a digital ping signal, and receives a signal strength packet. Therefore, a signal strength packet is associated with a combination of primary coils and does not represent the signal strength packet for a single primary coil. This is so intended to find an optimal combination when primary coils are driven simultaneously.

In the same way as described above, the wireless power transmitter repeats the same operation for combinations consisting of three primary coils ({1201, 1202, 1203}, {1202, 1203, 1204}, {1203, 1204, 1201}) and a combination consisting of four primary coils {1201, 1202, 1203, 1204} and obtains signal strength packets for combinations #1 to #12.

Referring again to FIG. 14, if reception of signal strength packets are completed for all of the combinations, the wireless power transmitter compares signal strength packets of the respective combinations and determines an optimal combination of primary coils. In other words, the wireless power transmitter may determine the number of primary coils to be driven (dual coil driving or quad coil driving) and/or a combination of primary coils to be driven from a signal strength packet for each combination. For example, the wireless power transmitter may determine a combination exhibiting the largest value among signal strength packets as the optimal combination of primary coils. Alternatively, the wireless power transmitter may determine a combination exhibiting signal strength larger than a threshold value among signal strength packets as the optimal combination of primary coils.

The operation of a wireless power receiver in the coil selection phase includes receiving a digital ping signal applied simultaneously through a combination of primary coils from a wireless power transmitter, transmitting a signal strength packet for the combination to the wireless power transmitter, and receiving wireless power through an optimal combination of primary coils after performing reception of a digital ping signal and transmission of a signal strength packet with respect to the combination repeatedly on the other combinations.

After an optimal combination of primary coils is selected, the wireless power transmitter and the wireless power receiver enter an identification and configuration phase S1410. In the identification and configuration phase, since communication transmitting and receiving an identification and configuration packet between the wireless power transmitter and the wireless power receiver is performed, the wireless power transmitter and/or the wireless power receiver may select a main coil for communication or a main coil and an adjacent coil. Selection of a main coil or a main coil and an adjacent coil is performed in a second selection phase. In the identification and configuration phase, ID of the wireless power receiver may be used for identifying the power class (PC) of the wireless power receiver.

After the identification and configuration phase is completed, the wireless power transmitter and the wireless power receiver enter a power transfer phase S1415. Depending on their power class, operations in the power transfer phase may differ from each other. When a wireless power receiver belongs to PC0, the wireless power transmitter performs power control while continuing power transfer. When a wireless power receiver belongs to PC1, the wireless power transmitter performs power transfer by driving (or activating) all of the four primary coils to support the PC1 wireless power receiver.

The wireless power transmitter according to the embodiment of FIG. 14 corresponds to the wireless power transmitter or the power transmitting unit disclosed in FIGS. 1 to 11. Therefore, the operation of the wireless power transmitter according to the present embodiment is implemented by a combination of one or two or more constituting elements of the wireless power transmitter of FIGS. 1 to 11. For example, in the present embodiment, the operation for transmitting a digital ping signal to a wireless power receiver according to the S1405 phase and the operation for performing power transfer according to the S1415 phase may be performed by the power conversion unit 110. Also, the operation for setting a ping level according to the S1400 phase, the operation for receiving a signal strength packet and the operation for selecting an optimal combination of primary coils according to the S1405 phase, and the operation for receiving an identification and configuration packet according to the S1410 phase may be performed by the communication & control unit 120.

Also, the wireless power receiver according to an embodiment of FIG. 14 corresponds to the wireless power receiver or the power receiving unit disclosed in FIGS. 1 to 11. Therefore, the operation of the wireless power receiver according to the present embodiment is implemented by a combination of one or two or more constituting elements of the wireless power receiver of FIGS. 1 to 11. For example, in the present embodiment, the operation for receiving a digital ping signal from a wireless power transmitter according to the S1405 phase and the operation for receiving power transfer according to the S1415 phase may be performed by the power pickup unit 210. Also, the operation for generating and transmitting a signal strength packet according to the S1405 phase and the operation for generating and transmitting an identification and configuration packet according to the S1410 phase may be performed by the communication & control unit 220.

Figure 16:
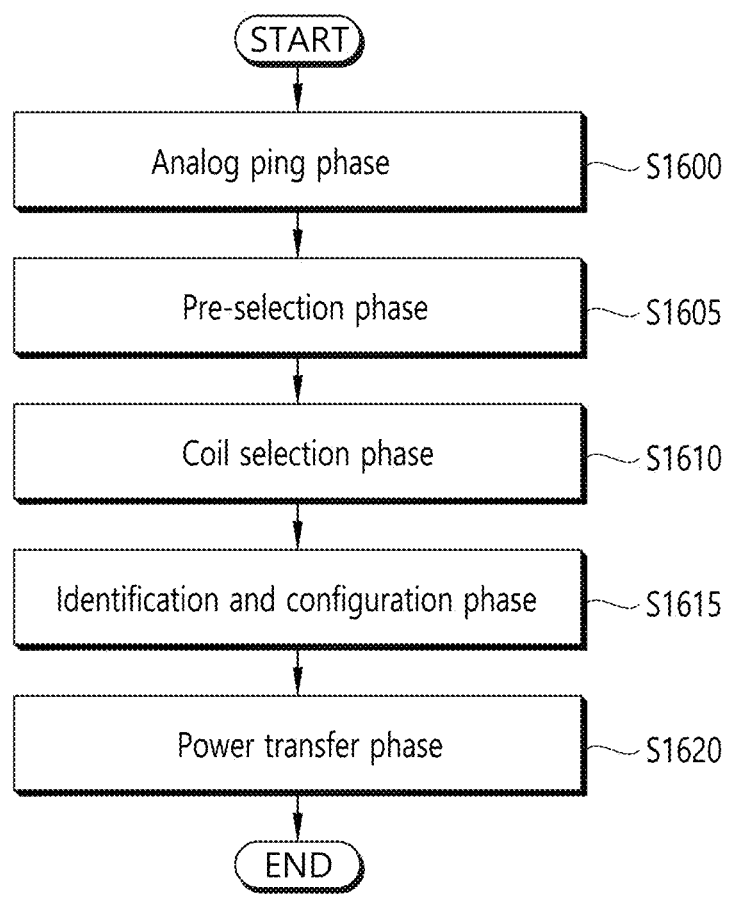
FIG. 16 is a flow diagram for performing selection of a primary coil according to another embodiment.

FIG. 16 is a flow diagram for performing selection of a primary coil according to another embodiment.

Referring to FIG. 16, a wireless power transmitter and a wireless power receiver enter an analog ping phase S1600. Here, the analog ping phase may be simply called a selection phase. The analog ping phase is intended to detect a wireless power receiver or the position of the wireless power receiver.

The operation of the wireless power transmitter in the analog ping phase may include a phase for applying (or transmitting) an analog ping signal sequentially to a plurality of primary coils and a phase for determining a combination of primary coils according to a response to the analog ping.

Here, a response to an analog ping may differ depending on the position of a secondary coil placed on the primary coil array. For example, a primary coil overlapping the secondary coil may provide a response to the analog ping while a primary coil not overlapping the secondary coil may not provide a response to the analog ping.

The wireless power transmitter deactivates a primary coil that does not provide a response (in what follows, it is called a selectable primary coil) and excludes the corresponding primary coil when configuring a combination of primary coils. Therefore, primary coils not providing a response are configured not to transmit a digital ping signal in the pre-selection phase. And the wireless power transmitter configures a combination of primary coils by using only selectable primary coils.

Figure 17:
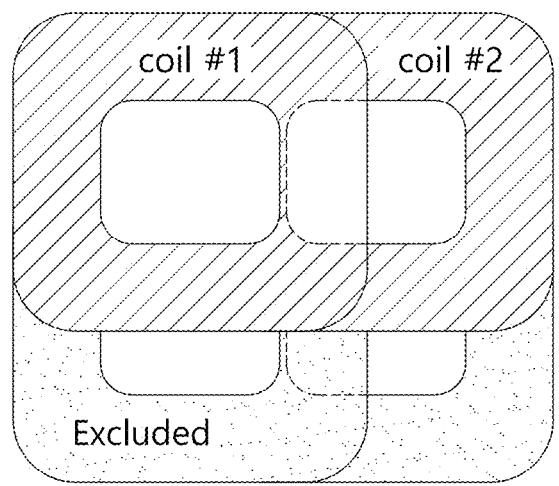
FIG. 17 illustrates a combination of primary coils constructed by using only selectable primary coils according to one example.
Figure 17:
Figure 17:
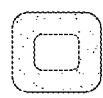

In the example of FIG. 17, if there is no response from the remaining two primary coils except for primary coil #1 and primary coil #2, the wireless power transmitter may configure a combination by using only the primary coil #1 and the primary coil #2. When a combination is configured, the wireless power transmitter may distinguish a main coil from adjacent coils. When the primary coil #1 is determined as the main coil, {#1} and {#1, #2} are obtained as two possible combinations. The combination {#1} corresponds to a case where the combination consists of only the primary coil #1, and the primary coil #1 is the main coil. The combination {#1, #2} corresponds to a case where the combination consists of the primary coil #1 and #2, and the primary coil #1 is the main coil, and the primary coil #2 is the adjacent coil. Meanwhile, when the primary coil #2 is determined as the main coil, {#2} and {#2, #1} are obtained as two possible combinations. The combination {#2} corresponds to a case where the combination consists of only the primary coil #2, and the primary coil #2 is the main coil. The combination {#2, #1} corresponds to a case where the combination consists of the primary coil #2 and #1, and the primary coil #2 is the main coil, and the primary coil #1 is the adjacent coil.

As described above, by excluding primary coils not providing a response before a combination is configured, the number of combinations for which to perform a digital ping may be reduced from 12 to 4, and as a result, time required for selecting an optimal coil combination may be reduced.

The present embodiment assumes that a wireless power transmitter performs the operation for configuring a combination of primary coils from selectable primary coils in the analog ping phase S1600; however, the operation for configuring a combination may also be performed in the pre-selection phase S1605 or in another separate phase.

Referring again to FIG. 16, if the analog ping phase is terminated, the wireless power transmitter and the wireless power receiver enter the pre-selection phase S1605. The pre-selection phase may include a phase for setting a ping level. Here, the ping level includes the levels for a digital ping. As one example, the phase for setting a ping level may set a ping level for each selectable primary coil. Also, ping levels set individually for the respective selectable primary coils may differ from each other. This is so because the distance to the secondary coil along the z-axis varies for each primary coil. Ping levels may be set differently from each other, but rectified voltages applied to the secondary coil may be set to be the same with each other.

If the pre-selection phase is completed, the wireless power transmitter and the wireless power receiver enter a coil selection phase S1610. The coil selection phase is intended to select a primary coil to be activated based on a signal strength (SS) packet.

The operation of a wireless power transmitter in the coil selection phase includes transmitting a digital ping signal to a wireless power receiver simultaneously through the corresponding primary coil(s) by activating a combination of primary coils, receiving a signal strength packet for the combination from the wireless power receiver, and determining an optimal combination of primary coils after performing transmission of a digital ping signal and reception of a signal strength packet performed with respect to the combination repeatedly on the other combinations.

Figure 18:
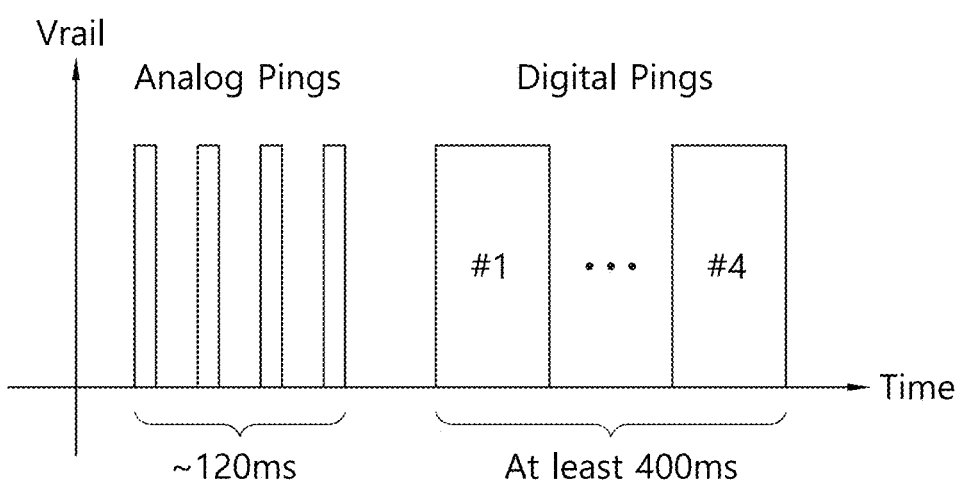
FIG. 18 illustrates a process for obtaining a signal strength packet by performing a digital ping for each combination by a wireless power transmitter according to another example.

A method for obtaining a signal strength packet by a wireless power transmitter for each combination is illustrated in FIG. 18.

FIG. 18 illustrates a process for obtaining a signal strength packet by performing a digital ping for each combination by a wireless power transmitter according to another example.

Referring to FIG. 18, a wireless power transmitter transmits analog ping signals from each of 12 primary coils. If the time required for transmitting a single analog ping signal is 10 ms, the analog ping phase for 12 primary coils is terminated within about 120 ms.

The wireless power transmitter configures a combination by using only selectable primary coils based on responses to the analog pings. And the wireless power transmitter sequentially activates the configured combinations #1 to #4, transmits a digital ping signal through each combination (the voltage applied across both ends of the coil is denoted as Vrail), and receives a signal strength packet for each individual combination of primary coils. If the time required for performing a digital ping using one combination is 100 ms, a total of 400 ms is consumed.

As shown in FIG. 15, since a total of 12 combinations get involved in performing a digital ping when the combinations are configured by using all of the primary coils, about 1200 ms is required. Therefore, even if the analog ping phase is considered, when a digital ping is performed based on a reduced combination as shown in FIG. 18, it may be known that the time required for coil selection is reduced.

Referring again to FIG. 16, if reception of signal strength packets are completed for all of the combinations, the wireless power transmitter compares signal strength packets of the respective combinations and determines an optimal combination of primary coils. In other words, the wireless power transmitter may determine the number of primary coils to be driven (dual coil driving or quad coil driving) and/or a combination of primary coils to be driven from a signal strength packet for each combination. For example, the wireless power transmitter may determine a combination exhibiting the largest value among signal strength packets as the optimal combination of primary coils. Alternatively, the wireless power transmitter may determine a combination exhibiting signal strength larger than a threshold value among signal strength packets as the optimal combination of primary coils.

The operation of a wireless power receiver in the coil selection phase includes receiving a digital ping signal applied simultaneously through a combination of primary coils from a wireless power transmitter, transmitting a signal strength packet for the combination to the wireless power transmitter, and receiving wireless power through an optimal combination of primary coils after performing reception of a digital ping signal and transmission of a signal strength packet with respect to the combination repeatedly on the other combinations.

After an optimal combination of primary coils is selected, the wireless power transmitter and the wireless power receiver enter an identification and configuration phase S1615. In the identification and configuration phase, since communication transmitting and receiving an identification and configuration packet between the wireless power transmitter and the wireless power receiver is performed, the wireless power transmitter and/or the wireless power receiver may select a main coil for communication or a main coil and an adjacent coil. Selection of a main coil or a main coil and an adjacent coil is performed in a second selection phase. In the identification and configuration phase, ID of the wireless power receiver may be used for identifying the power class (PC) of the wireless power receiver.

After the identification and configuration phase is completed, the wireless power transmitter and the wireless power receiver enter a power transfer phase S1620. Depending on their power class, operations in the power transfer phase may differ from each other. When a wireless power receiver belongs to PC0, the wireless power transmitter performs power control while continuing power transfer. When a wireless power receiver belongs to PC1, the wireless power transmitter performs power transfer by driving (or activating) all of the four primary coils to support the PC1 wireless power receiver.

The wireless power transmitter according to the embodiment of FIG. 16 corresponds to the wireless power transmitter or the power transmitting unit disclosed in FIGS. 1 to 11. Therefore, the operation of the wireless power transmitter according to the present embodiment is implemented by a combination of one or two or more constituting elements of the wireless power transmitter of FIGS. 1 to 11. For example, in the present embodiment, the operation for transmitting an analog ping signal to a wireless power receiver according to the S1600 phase, the operation for transmitting a digital ping signal to the wireless power receiver according to the S1610 phase, and the operation for performing power transfer according to the S1620 phase may be performed by the power conversion unit 110. Also, the operation for setting a ping level according to the S1605 phase, the operation for receiving a signal strength packet and the operation for selecting an optimal combination of primary coils according to the S1610 phase, and the operation for receiving an identification and configuration packet according to the S1615 phase may be performed by the communication & control unit 120.

Also, the wireless power receiver according to an embodiment of FIG. 16 corresponds to the wireless power receiver or the power receiving unit disclosed in FIGS. 1 to 11. Therefore, the operation of the wireless power receiver according to the present embodiment is implemented by a combination of one or two or more constituting elements of the wireless power receiver of FIGS. 1 to 11. For example, in the present embodiment, the operation for receiving a digital ping signal from a wireless power transmitter according to the S1600 phase, the operation for receiving a digital ping signal from the wireless power transmitter according to the S1610 phase, and the operation for receiving power transfer according to the S1620 phase may be performed by the power pickup unit 210. Also, the operation for generating and transmitting a signal strength packet according to the S1610 phase and the operation for generating and transmitting an identification and configuration packet according to the S1615 phase may be performed by the communication & control unit 220.

The pre-selection phase according to the S1400 phase of FIG. 14 and the S1605 phase of FIG. 16 includes a phase for setting a ping level individually to each primary coil. The reason why a ping level is compensated or set individually for each primary coil is to make the level of the voltage received by the wireless power receiver from each primary coil almost the same with each other. In what follows, a method for setting a ping level is disclosed.

Figure 19:
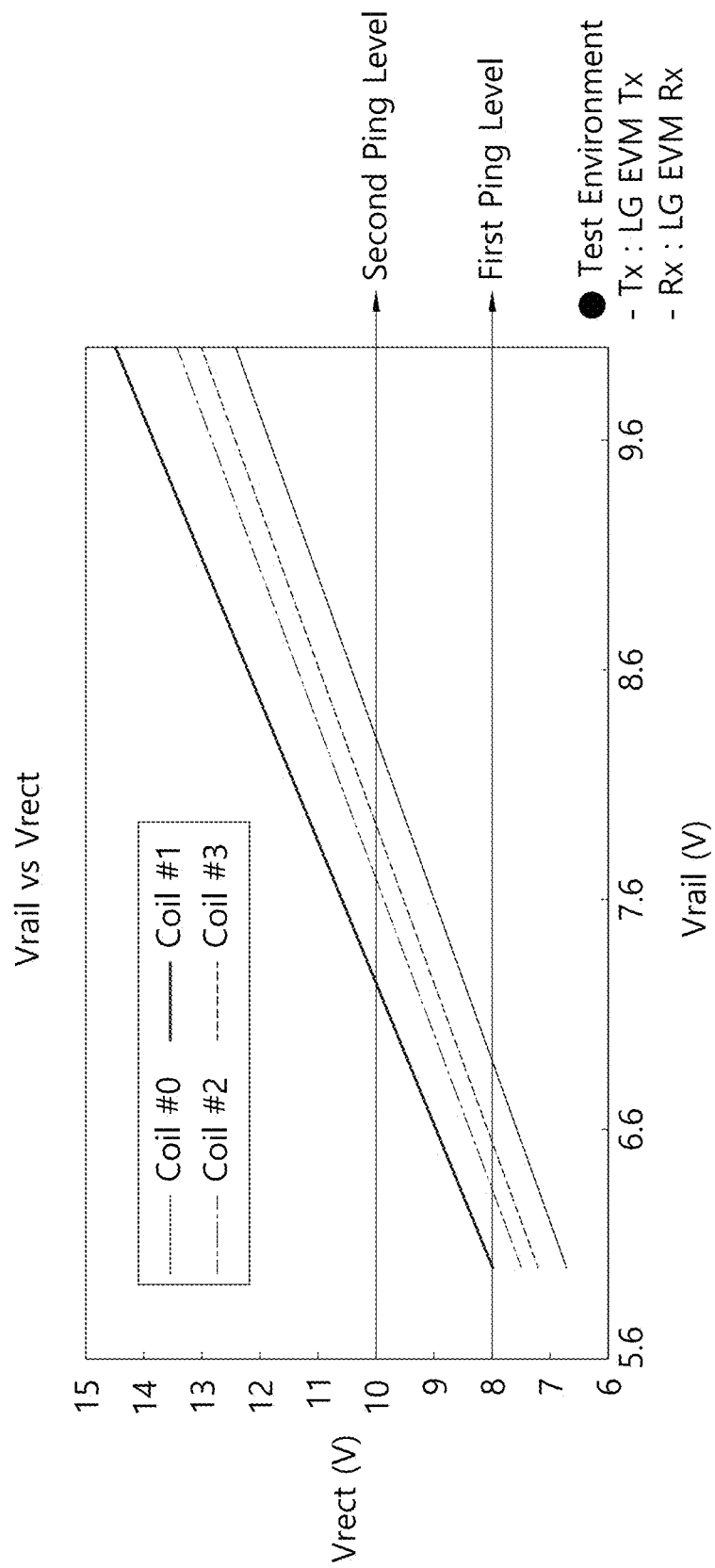
FIG. 19 is an experimental example illustrating a method for setting a ping level according to one embodiment.

FIG. 19 is an experimental example illustrating a method for setting a ping level according to one embodiment.

Referring to FIG. 19, a relationship between a driving voltage Vrail at the wireless power transmitter and a rectifier output voltage Vrect at the wireless power receiver may be modeled by a linear graph. In other words, Vrect is linearly proportional to Vrail. Therefore, the wireless power transmitter may make Vrect have a specific value by adjusting Vrail properly.

Even if the same Vrail is applied to primary coil #0, primary coil #1, primary coil #2, and primary coil #3, Vrect exhibits different values. Therefore, if Vrail is set differently for each primary coil, Vrect formed by each primary coil may be made to have the same value.

For example, Vrail that makes all of the primary coils develop the same Vrect may be set as a first ping level or a second ping level. It may be known that at the first ping level, Vrail of primary coil #0 is approximately 7V, Vrail of primary coil #1 is approximately 6V, Vrail of primary coil #2 is approximately 6.4V, and Vrail of primary coil #3 is approximately 6.6V As described above, by adjusting the ping level (namely, the driving voltage Vrail) properly for each primary coil, the wireless power transmitter may make Vrect for all of the primary coils under the same condition become the same specific value.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A wireless power transmitter configured to transmit wireless power, the wireless power transmitter comprising:
   a power converter configured to transmit the wireless power to a wireless power receiver based on a primary coil array through magnetic coupling,
   wherein the primary coil array comprises a plurality of primary coils; and
   a communicator & controller configured to control the wireless power,
   wherein the wireless power transmitter is configured to:
   perform an analog ping,
   wherein the analog ping results in a first set of primary coil combinations, among the plurality of primary coils of the wireless power transmitter;
   for each of the primary coil combinations in the first set, perform, in a ping phase, a digital ping after performing the analog ping;
   receive, from the wireless power receiver in the ping phase, at least one signal strength packet after the digital ping;
   select a second set of primary coil combinations based on the at least one signal strength packet related to the digital ping among the first set related to the analog ping;
   receive, from the wireless power receiver in a configuration phase, a configuration packet including an out-band field after the ping phase,
   wherein the out-band field informs whether the wireless power receiver supports an out-band communication or not; and
   receive, from the wireless power receiver in a negotiation phase, a foreign object detection (FOD) status packet after the configuration phase,
   wherein the FOD status packet includes a reference quality factor value,
   wherein the wireless power transmitter performs FOD based on the reference quality factor value.

2. A method for transmitting wireless power, the method performed by a wireless power transmitter including a plurality of primary coils and comprising:
   performing an analog ping, wherein the analog ping results in a first set of primary coil combinations, among the plurality of primary coils of the wireless power transmitter;

for each of the primary coil combinations in the first set, performing, in a ping phase, a digital ping after performing the analog ping;

receiving, from a wireless power receiver in the ping phase, at least one signal strength packet after the digital ping;

selecting a second set of primary coil combinations based on the at least one signal strength packet related to the digital ping among the first set related to the analog ping;

receiving, from the wireless power receiver in a configuration phase, a configuration packet including an out-band field after the ping phase, wherein the out-band field informs whether the wireless power receiver supports an out-band communication or not; and receiving, from the wireless power receiver in a negotiation phase, a foreign object detection (FOD) status packet after the configuration phase, wherein the FOD status packet includes a reference quality factor value, wherein the wireless power transmitter performs a FOD based on the reference quality factor value.

* * * * *